April 17, 1928. Re. 16,934
A. WERTENBRUCH
BAG FILLING MACHINE
Original Filed Nov. 9, 1925 2 Sheets-Sheet 1
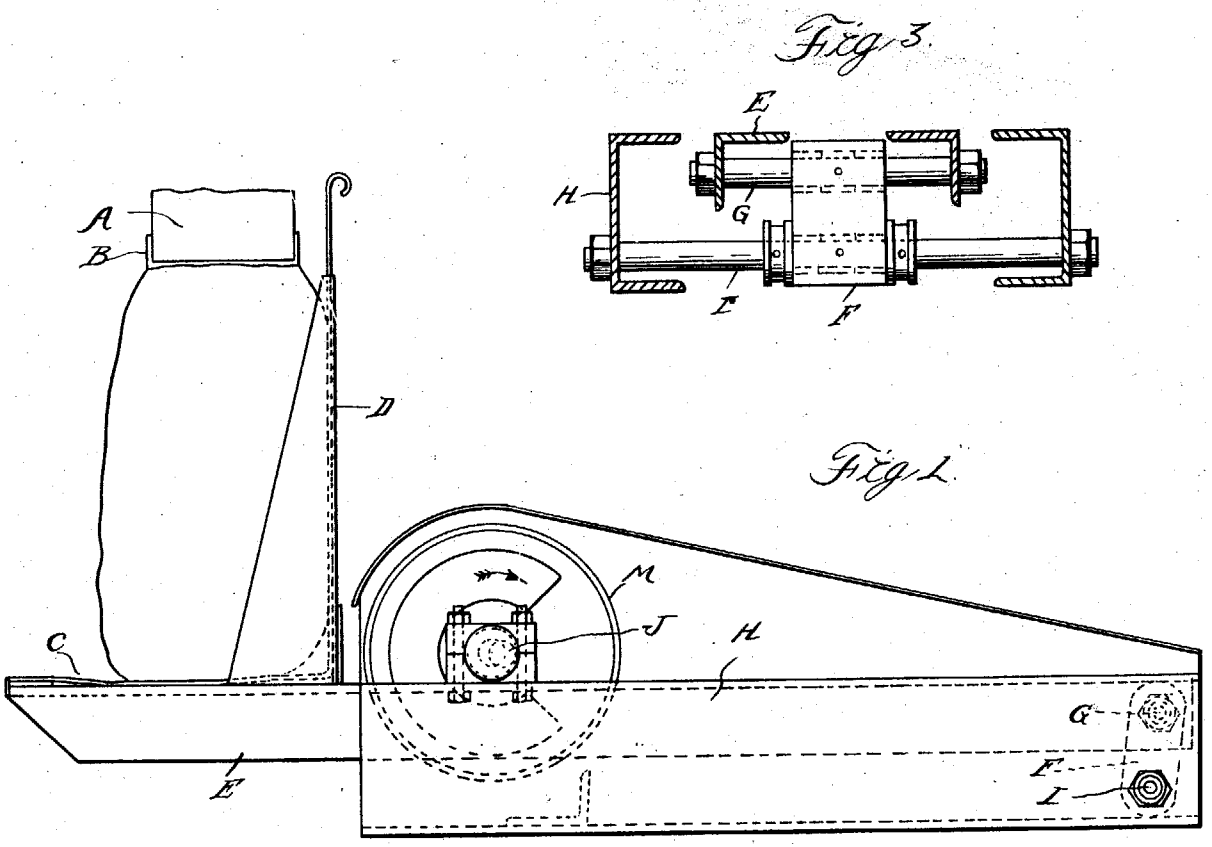
Inventor
Antony Wertenbruch
By Whittemore & Hulbert Whittemore & Bethune
Attorneys April 17, 1928.
Re. 16,934
A. WERTENBRUCH
BAG FILLING MACHINE
Original Filed Nov. 9, 1925 2 Sheets-Sheet 2
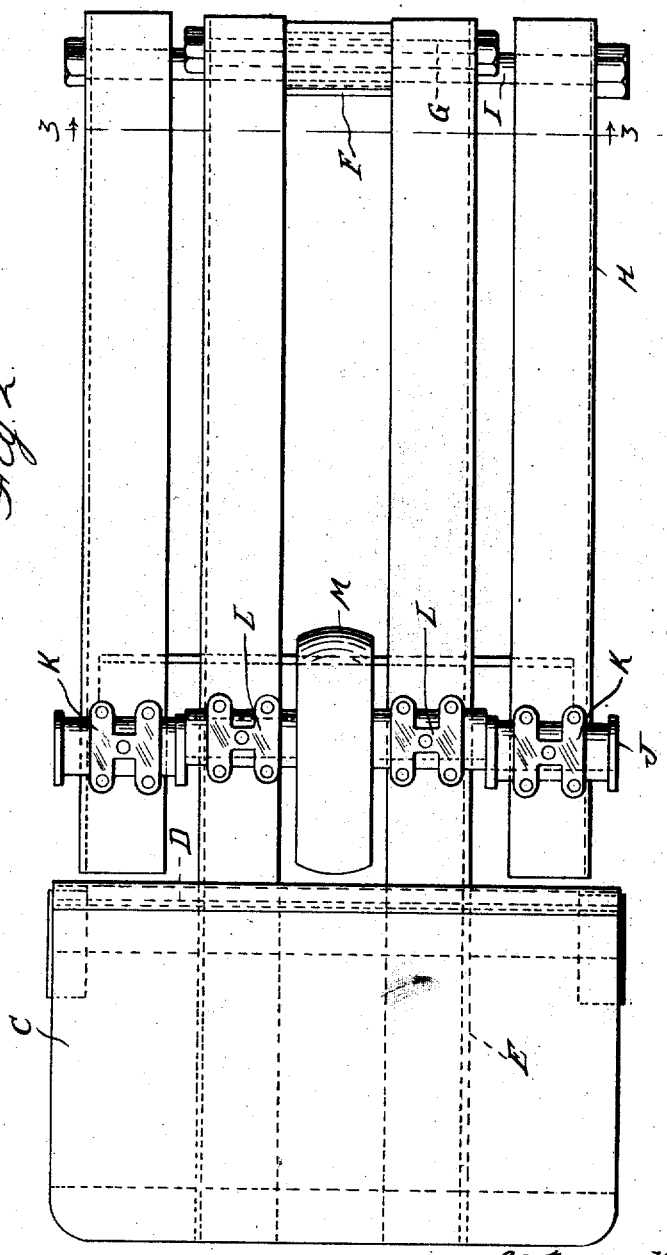
Inventor
Antony Wertenbruch
By Whittemore, Hulbert & Whittemore, Belknap
Attorneys Reissued Apr. 17, 1928. Re. 16,934

UNITED STATES PATENT OFFICE.

ANTONY WERTENBRUCH, OF DETROIT, MICHIGAN, ASSIGNOR TO LARROWE MILLING COMPANY, OF DETROIT, MICHIGAN, A CORPORATION OF OHIO.

BAG-FILLING MACHINE.

Original No. 1,616,016, dated February 1, 1927, Serial No. 67,984, filed November 9, 1925. Application for reissue filed December 5, 1927. Serial No. 237,962.

The invention relates to bag filling machines and more particularly to a means for increasing the content by weight of the filled bag. To this end the invention consists in the peculiar construction of means for compacting the material within the bag during filling operations as hereinafter set forth.

In the drawings;

Figure 1 is a side elevation of the machine.

Figure 2 is a plan view thereof.

Figure 3 is a cross section.

In the filling of bags with granular material it is usual to place the mouth of the bag around the filling spout and to support the bottom on a shelf or platform. Where the material is discharged from the spout by gravity it would be loosely arranged and therefore greater in bulk than when in a compacted state. Consequently it is difficult to place within the bag the full quantity by weight which it is designed to hold. To avoid this difficulty I have devised my mechanism for imparting an oscillatory movement to the bag supporting platform such as to effect the compacting of the material by inertia and without displacement of the bag in relation to its support.

In detail A represents the discharge spout from a bag filling machine of any suitable construction and B the bag to be filled having its mouth surrounding said spout. C is a shelf or platform for supporting the bottom of the bag and D a vertically extending wall rising from said shelf against which the bag may rest.

The platform C and wall D are mounted upon an oscillatory frame comprising the horizontally extending parallel bars E shown as metallic angle bars. F is a link pivotally attached to the rear end of the bars E by a bolt or pivot pin G. H are stationary beams on opposite sides of the bars E and which support the link F through the medium of a bolt I. J is a crank shaft extending transversely across the bars E and the beams H being journaled in bearings K upon said beams and having its cranks or eccentric portions engaging bearings L on the bars E. M is a pulley mounted on the shaft J and driven by a belt or other suitable drive connection not shown.

With the construction as described, it will be noted that the platform C and wall D are supported on the forwardly projecting portion of the bars E, which in turn are supported by the crank J and link F. Thus, when the pulley M is driven in the direction indicated by the arrow, an oscillatory movement will be imparted to the bars E and platform C and wall D carried thereby. The direction of movement is such that when the platform changes from a downward to an upward movement it is also travelling outward but at decreasing velocity. Thus, inertia will cause the compacting of the material against both the bottom and the rear wall and will hold the bag from relative displacement. On the other hand, on the reversal from upward to downward movement, gravity will assist in overcoming the inertia or the displacement of the bag thereby. The total effect is to compact the content of the bag during the filling operation so that the full quantity may be placed therein.

What I claim as my invention is:

1. The combination with means for discharging material into the mouth of a bag, of a support for the bottom and one side of the bag and means for imparting to said support an oscillatory movement in a vertical plane and in a direction to press the side support against said bag on reversal from downward to upward movement of the bottom support therefor.

2. The combination with means for discharging material into the mouth of a bag, of a support for said bag comprising a horizontally extending bar, a pivotal link for supporting one end of said bar, a revoluble crank for engaging an intermediate portion of said bar and a platform and side wall for engaging the bag mounted on the free end of said bar.

3. The combination with means for discharging material into the mounth of a bag, of a support for said bag comprising a pair of parallel horizontally extending bars, a swinging link for pivotally connecting and supporting the rear ends of said bars, a revoluble crank shaft for engaging the intermediate portion of said bars and a platform and side supporting wall for the bag mounted on the forward end portion of said bars.

4. The combination with means for discharging material into the mouth of a bag, of a support for said bag comprising a horizontally extending bar, a pivotal link for supporting the rear end of said bar, a crank shaft for engaging an intermediate portion of said bar to oscillate the same in a vertical plane and in a direction to reverse from downward to upward movement while said bar is also moving outwardly, and a platform and rear supporting wall for said bag mounted on said bar.

5. The combination with means for discharging material into the mouth of a bag, of a support for said bag comprising a platform and a vertically extending wall mounted on said platform against which the bag is adapted to rest, and means for imparting an oscillatory movement to said support in a direction to retain the bag from relative displacement by inertia.

6. The combination with means for discharging material into the mouth of a container, of a support for the bottom and one side of the container comprising a platform and a vertically extending wall mounted on said platform, said platform adapted to be mounted on a frame comprising a pair of horizontally extending parallel bars, and means for imparting an oscillatory movement to said frame in a vertical plane and in a direction to press the wall against said container on reversal from downward to upward movement of the platform.

7. The combination with means for discharging material into the mouth of a bag, of a support for said bag comprising a horizontally extending bar, means associated with said bar for imparting an oscillatory movement to said bag, and a platform and side wall for engaging the bag mounted on said bar.

8. The combination with means for discharging material into the mouth of a receptacle, of a support for said receptacle and means for imparting to said support a gyratory movement in a vertical plane and in a direction to compact the material by its own inertia simultaneously against the bottom and one side wall of said receptacle.

9. The combination with means for discharging material into the mouth of a receptacle, of a support for said receptacle, means for imparting to said support a gyratory movement in a vertical plane and in a direction to press the material by its inertia against one side of said receptacle during and subsequent to reversal from downward to upward movement of said support.

In testimony whereof I affix my signature.

ANTONY WERTENBRUCH.